Dec. 2, 1924. 1,518,099
D. R. NEISWENDER
TRAY HOLDER
Filed Feb. 24, 1923
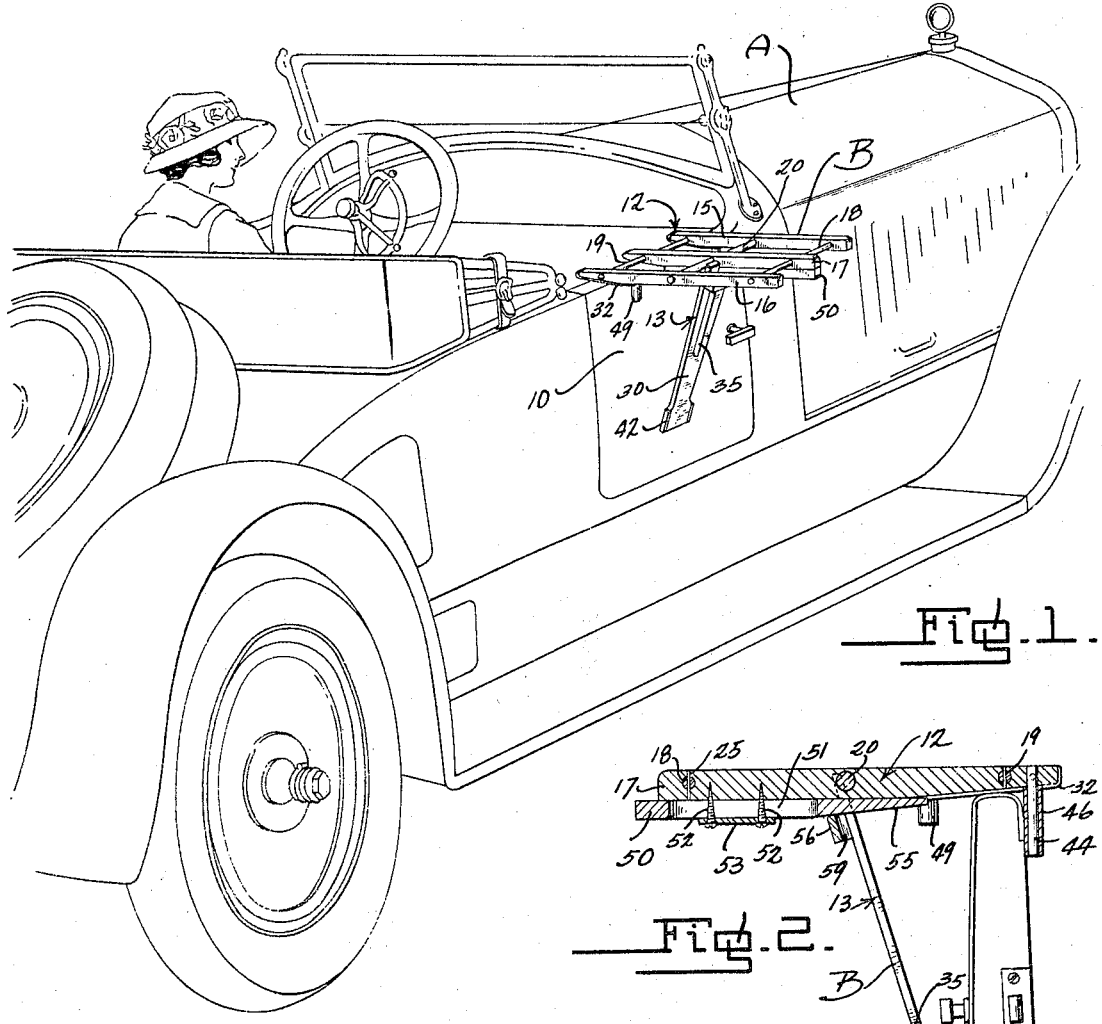
Fig.1.
Fig.2.
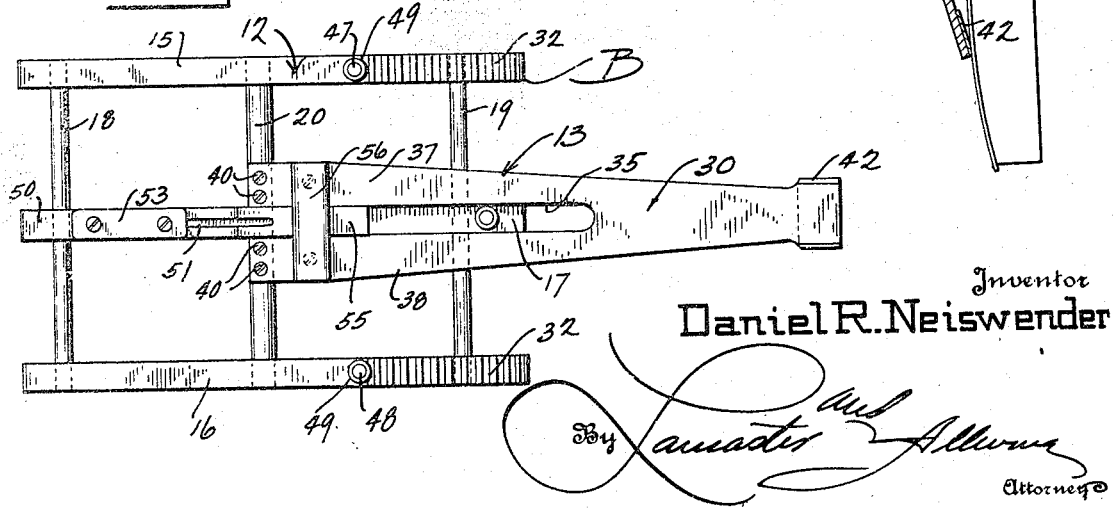
Fig.3.
Inventor
Daniel R. Neiswender
By
Attorneys Patented Dec. 2, 1924.

1,518,099

UNITED STATES PATENT OFFICE.

DANIEL R. NEISWENDER, OF TOPEKA, KANSAS.

TRAY HOLDER.

Application filed February 24, 1923. Serial No. 620,908.

*To all whom it may concern:*

Be it known that I, DANIEL R. NEIS-WENDER, a citizen of the United States, residing at Topeka, in the county of Shawnee and State of Kansas, have invented certain new and useful Improvements in Tray Holders, of which the following is a specification.

This invention relates to a novel and improved tray holder or table which may be supported, upon a substantially vertical or inclined surface of an automotive vehicle.

A further object of this invention is the provision of a table or tray holder which may be used in connection with automotive vehicles, being readily attachable to the sides or doors thereof, whereby the occupant of the car may be served with soft drinks, meals, and the like.

A further object of this invention is the provision of a table or tray holder of the above mentioned character, embodying features which will permit its facile adjustment to fit practically any type of vertical or inclined wall, so that the table portion thereof may be supported in a horizontal plane in stable and effective manner for supporting considerable weight thereon without liability of tipping.

Other objects and advantages of this invention will be apparent during the course of the following detailed description.

In the accompanying drawing, forming a part of this specification, and wherein similar reference characters designate corresponding parts throughout the several views.

Figure 1 is a perspective view of an automotive vehicle, showing the application of the improved tray holder to the door thereof, whereby the occupant of the car may be rendered any type of service without necessity of leaving the vehicle.

Figure 2 is a cross sectional view, taken longitudinally through the improved tray holder, showing the manner in which the same is supported so that the table portion thereof is in a horizontal plane.

Figure 3 is a bottom plan view of the improved tray holder showing the parts thereof in collapsed condition.

In the drawing, wherein for the purpose of illustration is shown but the preferred embodiment of this invention, the letter A may generally designate a vehicle of any approved type, having a door or other wall 10 thereon upon which the improved tray holder B may be detachably positioned to provide a table for supporting trays, receptacles, dishes and the like. The improved tray holder B preferably comprises a table portion 12, and the supporting means 13.

Referring to the improved tray holder table portion 12, while the same may be formed of a single piece of board or light metal, such as aluminum, it is preferred that the same be of skeleton frame work, since in most instances the same will be used to support a tray, and which provides a light and economical construction. To this end the table portion 12 preferably includes the side longitudinal pieces 15 and 16, and the central longitudinal piece 17, which are connected in parallel relation by means of rungs 18 and 19 which are pinioned or transversely inserted through aligning apertures at the ends of the longitudinal frame pieces 15, 16, and 17, substantially as is illustrated in the drawing. A central shaft 20 is preferably rotatably carried by the longitudinal frame pieces 15, 16 and 17, intermediate the ends of the table portion 12; being disposed in parallel relation with the rungs 18 and 19, and supported in aligning openings in the longitudinal frame pieces 15, 16 and 17, similar to the rungs 18 and 19. While the rungs 18 and 19 are preferably fixed against rotation by means of transverse nails or pins 25, it is preferred that the shaft 20 be oscillatively supported by the table portion 12, so that the leg brace member 30 of the table supporting means 13 may be connected thereto for angular adjustment with respect to the plane of the table portion 12. At the end of the table portion 12, where the rung 19 is transversely positioned, it is preferred that the side pieces 15 and 16 be tapered in reduced manner toward the free ends thereof and from the under surface of the table portion 12, and receive resilient wear strips 32 thereon, which normally rest against the top surface of the wall, door or other elements 10, when the tray B is in position, as to not injure said wall 10.

Referring to the supporting means 13, the same as before mentioned includes a relatively long brace leg 30 which is preferably of wood or analogous light weight material, being preferably provided with a relatively wide and long slot 35 extending inwardly from the top thereof as to bifurcate the upper end of said leg, providing the portions 37 and 38 thereon which are adapted for attachment, as by screws 40, or like securing elements to the oscillative shaft members 20 upon opposite sides of the central longitudinal bar or member 17, substantially as is illustrated in the drawing. The provision of the slot 35 permits the leg 30 to be collapsed in substantially parallel position upon the bottom of the table portion 12, so that the lower part of the bar or longitudinal piece 17 may rest within the slot 35, substantially as is illustrated in Figure 3 of the drawing. The lower end of the leg 30 provides a relatively wide surface, and is preferably faced with resilient wear material 42.

For cooperation with the adjustable leg 30, a pin 44 depends from the lower surface of the table portion 12, preferably being attached at the free end of the central longitudinal member 17 adjacent rung 19. This pin 44 is preferably provided with a resilient surface engaging sleeve 46. It is also preferred to provide depending pins 47 and 48 upon the table side pieces 16 and 17 respectively, which are provided with resilient wear sleeves 49. These pins 47 and 48 are located on a transverse line intermediate the forward depending pin 44 and the pivotal connection of the brace leg 30, so that they will be positioned upon the opposite side of the supporting wall or door 10 from the pin 44, when the improved tray holder B is applied to such wall or door 10. The leg 30 is provided with novel means to secure the same in fixed position at a desired angle with respect to the plane of the table portion 12, which includes a wedge member 50 slidably supported upon the bottom surface of the table portion 12. The wedge member 50 is preferably provided with a slot 51 longitudinally therein, which receives the shanks of detachable screws 52 therein; the screws 52 supporting a plate 53 which stably connects the wedge member 50 upon the bottom surface of the central longitudinal piece 17, so that the same may longitudinally slide thereon. The lower surface 55 of that end of the wedge member 50 which faces the pivotal connection of the supporting leg 30 is preferably tapered in reduced manner toward said end of the wedge member 50, and which wedge surface 55 is adapted for receiving a transverse piece 56 of the leg 30 thereagainst, so that said leg 30 may be rigidly braced against the wedge member 50, substantially as is illustrated in the drawing. The transverse wedge engaging member 56 is of course connected to the bifurcated end of the leg 30 adjacent its pivotal connection to the table portion 12, and it is preferred that that portion of the transverse wedge engaging member 56 which extends across the slot 35 is recessed, as at 59, so that when the leg 30 is collapsed upon the table portion 12, said recess 59 will receive the wedge 50 therein.

The application of the improved tray holder B to the door 10 of an automotive vehicle A is obvious. Assuming that it is the desire of the occupant of the car or vehicle to have the table portion 12 extending outwardly from the door 10, the table portion 12 is so placed that the resilient sleeve 46 of the pin 44 engages the inside of the door 10 adjacent its top edge, with the upper resilient wear strips 32 resting upon the top edge of the door 10, substantially as is illustrated in Figure 2 of the drawing. If the leg 30 is not properly positioned so that the lower end thereof may engage the outside of the door 10 to support the table portion 12 in a horizontal plane, it is merely necessary for the operator to press inwardly or pull outwardly the wedge member 50, so that the transverse piece 56 of the leg 30 may engage against the inclined wedge surface 55 of the sliding wedge member 50 to properly position the leg 30 for supporting the table 12 in the desired horizontal plane. It is obvious that the angular position of the leg 30 with respect to the plane of the table portion 12 may be adjusted by sliding movement of the wedge member 50 along the longitudinal frame piece 17. When the tray holder B is located in such relation upon the door or other support 10, the same under weight of the table portion 12, and any articles which may be placed thereon, is in stable position against liability of any lateral slipping. The tray holder or table device may be quickly lifted from the door 10 without readjustment of any parts thereof, when it is desired that the same be removed from the vehicle A.

While the application of the improved tray holder B has been illustrated and set forth herein as with an automobile A, it is to be understood that the same may be used for a variety of purposes, in any place where it is desired to provide a substantially horizontal supporting table, the parts of which may be readily, quickly, and conveniently attached or detached from a support.

Various changes in the shape, size and arrangement of parts may be made to the form of the invention herein shown and described, without departing from the spirit of the invention or the scope of the claims.

I claim:

1. In a device of the class described a table portion, a leg pivoted to the table portion, and a wedge slidable on the table portion for engaging the leg whereby the latter may be rigidly braced in various angular positions with respect to the plane of the table.

2. In a device of the class described, the combination of a table portion, a shaft rotatably supported by the table portion, a leg carried by said shaft and depending for swinging movement from the bottom of said table portion, and a wedge member slidably positioned upon the bottom of said table portion adapted to receive the brace leg thereagainst whereby the leg may be rigidly braced in various angular relations with respect to the plane of the table portion.

3. In a device of the class described a table or supporting portion, a leg swingably carried by said table portion, a wedge member, means slidably positioning the wedge member upon said table portion whereby the wedge portion of said wedge member may be adjustably positioned for engagement by said leg so that the leg may be rigidly positioned in various angular attitudes with respect to the plane of the table portion.

4. In a device of the class described a table portion, a shaft rotatably and transversely positioned upon the table portion, a leg swingably carried by said shaft with respect to the table portion and depending from the lower surface of the table portion and intermediate its ends, said leg having a transverse piece, a member slidable upon said table portion including an inclined wedge surface adapted for relative adjustment with respect to the transverse piece of the leg and adapted for engagement by said transverse piece of the leg whereby said leg may be fixedly braced in various angular attitudes with respect to the table portion.

5. A tray holder comprising a table portion including side and central longitudinal members and transverse supporting rungs at the ends thereof, a shaft oscillatively supported by the side and longitudinal members at the transverse center of said table portions, a brace leg having an end thereof bifurcated to provide a slot extending inwardly from the upper end thereof, means connecting the bifurcated end of the brace leg to the shaft whereby the leg is swingably positioned upon said table portion, a transverse brace piece carried at the bifurcated pivoted end of the brace leg, a wedge member slidably carried by the central longitudinal member of said table portion on the same side thereof from which said leg swingably depends, said wedge member having an inclined surface against which said brace piece of the brace leg may engage to support the leg in various angular adjustments with respect to the plane of the table portion, and a pin projecting from an end of the supporting table toward which the brace legs swing, said brace leg being adapted for collapsing upon the table portion in substantially parallel relation thereon when not in use.

6. In a tray holder of the class described a table portion, a supporting brace pivotally connected to the table portion, and a member movably connected to the table portion having a surface thereon inclined with respect to the plane of the table which may be moved so that the brace may engage said surface at various points thereon to adjust the angularity of the brace with respect to the table.

DANIEL R. NEISWENDER.